O. E. BARTHEL.
MOTOR VEHICLE.
APPLICATION FILED SEPT. 23, 1914.

1,234,854.

Patented July 31, 1917.
4 SHEETS—SHEET 1.

Witnesses
Chas. W. Stauffiger
Anna M. Dorr.

Inventor
Oliver E. Barthel,
By
Attorney

O. E. BARTHEL.
MOTOR VEHICLE.
APPLICATION FILED SEPT. 23, 1914.

1,234,854.

Patented July 31, 1917.
4 SHEETS—SHEET 2.

Witnesses
Chas. W. Stauffiger
Anna M. Dorr.

Inventor
Oliver E. Barthel,
By
Attorneys

O. E. BARTHEL.
MOTOR VEHICLE.
APPLICATION FILED SEPT. 23, 1914.

1,234,854.

Patented July 31, 1917.
4 SHEETS—SHEET 3.

Witnesses
Chas W. Stauffiger
Anna M. Dorr

Inventor
Oliver E. Barthel,
By
Attorneys

O. E. BARTHEL.
MOTOR VEHICLE.
APPLICATION FILED SEPT. 23, 1914.
1,234,854.
Patented July 31, 1917.
4 SHEETS—SHEET 4.
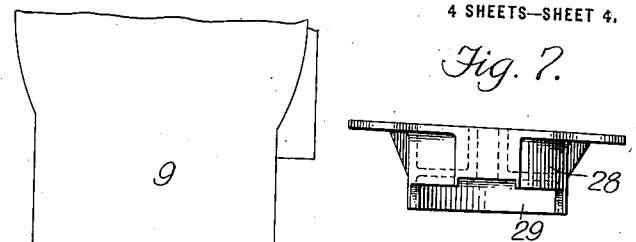
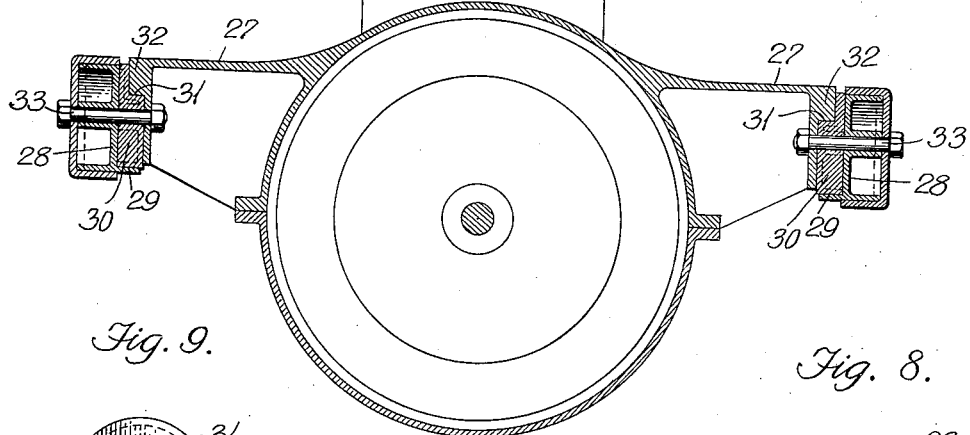
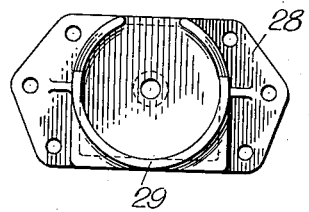
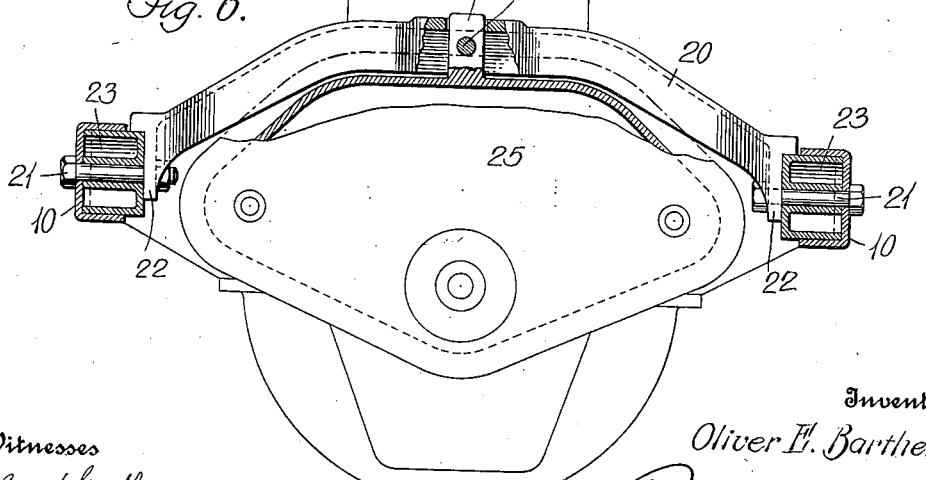
Witnesses
Chas. W. Stauffiger
Anna M. Dorr
Inventor
Oliver E. Barthel,
By
Attorneys

UNITED STATES PATENT OFFICE.

OLIVER E. BARTHEL, OF DETROIT, MICHIGAN, ASSIGNOR TO STANDARD STEEL CAR CO., OF PITTSBURGH, PENNSYLVANIA, A CORPORATION OF PENNSYLVANIA.

MOTOR-VEHICLE.

1,234,854.   Specification of Letters Patent.   Patented July 31, 1917.

Application filed September 23, 1914. Serial No. 863,073.

*To all whom it may concern:*

Be it known that I, OLIVER E. BARTHEL, a citizen of the United States of America, residing at Detroit, in the county of Wayne and State of Michigan, have invented certain new and useful Improvements in Motor-Vehicles, of which the following is a specification, reference being had therein to the accompanying drawings.

This invention relates to improvements in motor vehicles and more particularly to an improved chassis having a novel construction and arrangement of driving and brake mechanism, the object of said invention being to provide an arrangement whereby the thrust of the traction wheels is transmitted directly to the side members of the frame which are tied together by the thrust member and are arranged to give the maximum strength and provide simplicity of construction, said thrust member being arranged with the transverse axis of its pivotal connections to the side members coincident with the axis of the universal joint of a driving shaft carried by said thrust member. A further object of the invention is to so mount the brake operating mechanism that the same will not be affected by the movements of the axle relative to the frame, and to provide certain other new and useful features in the construction of motor support and arrangement of other parts, all as hereinafter more fully described, reference being had to the accompanying drawings in which—

Fig. 5 is an enlarged transverse section on the line V—V of Fig. 1;

Fig. 6 is a similar section on the line VI—VI of Fig. 1;

Fig. 7 is a detail showing a socket member in plan view;

Fig. 8 is a detail showing the socket member in elevation;

Fig. 9 is a detail showing a pivot block in elevation; and

Figure 1:
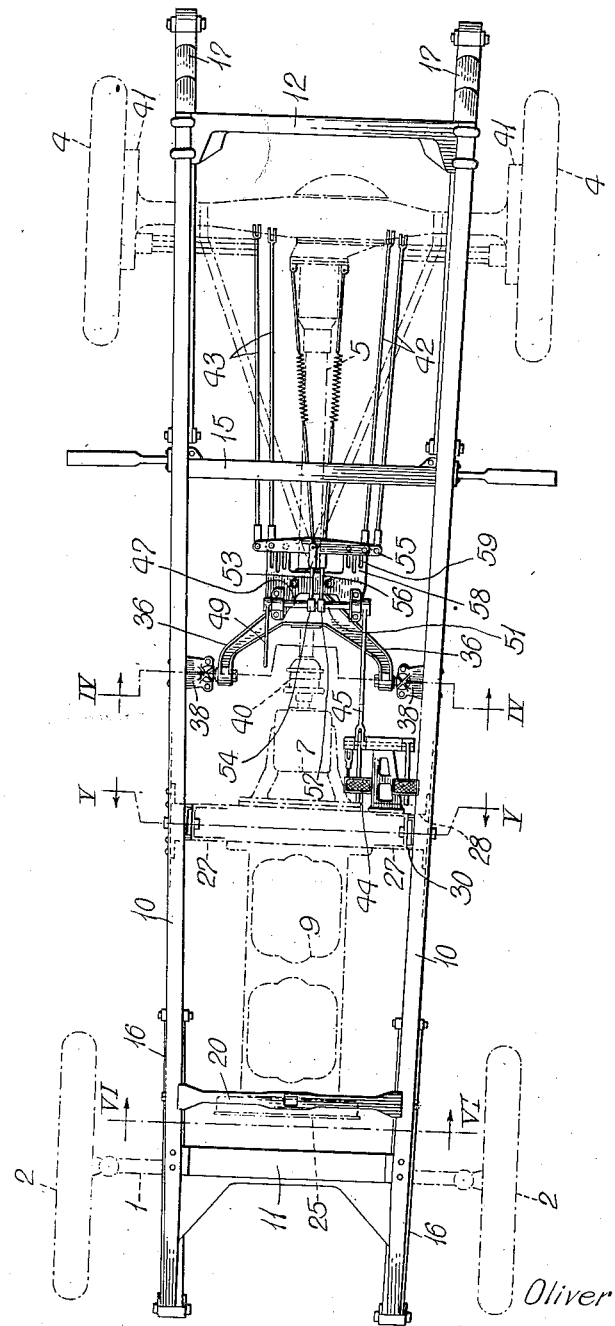
Figure 1 is a plan view of a motor vehicle chassis embodying the invention.
Figure 2:
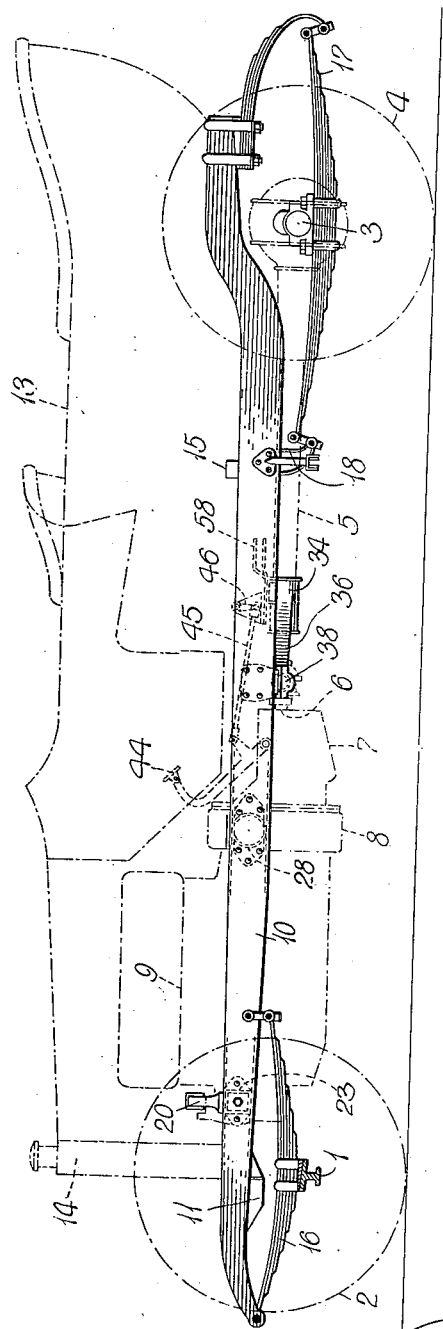
Fig. 2 is a side elevation of the same.

As shown in dotted lines in Figs. 1 and 2, the vehicle is supported upon the usual front axle 1 provided with steering wheels 2, and a rear tubular axle 3 having driving wheels 4 and a forwardly extending torque tube 5 within which is housed a suitable drive shaft 6 for transmitting motion from suitable change speed mechanism, (not shown) contained within a casing 7 which is secured to a fly wheel casing 8 formed integral with or secured to the rear end of the crank case of an internal combustion engine 9, the parts being all constructed and arranged in an old and well known manner.

The axles are connected and the engine and load carried by a frame comprising side channel bars 10 which are straight throughout their length in plan view and are connected near their front and rear ends by cross members 11 and 12 respectively. As shown in Fig. 2, a vehicle body 13 is supported by and secured directly upon the upper edge of said frame with the radiator 14 of the vehicle above the cross member 11. An intermediate cross member 15 also serves to tie the side frame members together, and semi-elliptic springs 16 are clipped intermediate their ends to the front axle directly beneath the forward ends of said frame members, with their ends pivotally attached in the usual manner to said frame and thus yieldingly connect the frame and front axle. The frame is yieldingly connected to and supported upon the rear axle by three-quarter elliptic springs 17, and each of these springs is clipped intermediate its ends to the under side of the rear axle with its forward end pivotally attached to a bracket 18 extending downward from the lower side of the side member 10 and cross member 15 where it joins the side member.

The engine 9 is supported at its forward end by means of an arched cross bar 20 shown in detail in Fig. 6, this bar being secured at each end to a channel bar 10 of the frame by means of a single bolt 21 extending through an opening in a flange 22 projecting downwardly adjacent to the inner side of the channel bar and in contact with the inner end of a suitable filler block 23 within the channel and through which block and channel the bolt extends. At the center of the arch of said cross bar 20 is formed an opening or socket to receive an upwardly projecting lug 24 on the gear casing 25 at the forward end of the engine, and a single bolt 26 passes through a horizontal opening in said lug and through the bar to form a pivotal support for the forward end of the motor, the axis of which extends horizontally longitudinally of the motor in the vertical plane of the longitudinal axis of the motor.

The motor is supported at its rear end by suitable arms 27 integral with the fly wheel casing 8 extending laterally therefrom with their end faces adjacent to the inner sides of the side channel members of the frame. Suitable filler blocks 28 are riveted or otherwise secured in the channels of the frame members opposite the ends of the arms and each of these blocks is formed with an inwardly extending semi-circular flange 29 forming a socket to receive a circular pivot block 30 which is free to turn therein and at its inner end and upper side is cut away or notched to form a flat shoulder 31 or seat for a like shoulder formed by a projecting portion 32 on the end face of the adjacent arm 27. A single bolt 33 passes through axial openings in the socket of the filler block and pivot block, and also through an opening in the end wall of the arm to pivotally hold the motor in place upon the pivot blocks and tie the side members of the frame together. These pivot blocks form strong and accurate supports and at the same time permit of a free turning movement of the motor relative to the frame members upon distortion due to unevenness of the road bed or surface over which the vehicle is traveling. The motor is thus pivotally suspended from the frame at three points upon which it turns freely due to the manner in which the pivots are constructed and, as the supporting arms of the motor are of lesser length than the distance between the side members of the frame and at its forward end the motor is supported by a lug extending upward through its cross bar, the motor may be quickly detached from the frame by removing the three bolts 26 and 33 and dropping the motor through the frame. The removal of the motor is thus facilitated as it is unnecessary to raise the motor out of the frame.

Figure 3:
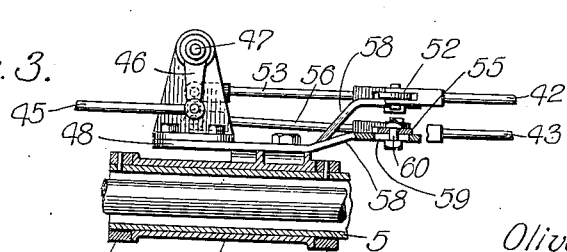
Fig. 3 is an enlarged detail showing brake supporting and operating mechanism in side elevation.

The torque tube 5 which extends forwardly from the rear axle, is connected at its forward end to the frame to transmit the thrust of the rear driving wheels directly thereto, by providing a head 34 having a bore to receive the ends of the tube which is adapted to turn freely therein and is prevented from longitudinal movement therethrough by any suitable means, such as collars 35 secured on the tube at each side of the head, as shown in Fig. 3. This head has laterally and forwardly extending arms 36 terminating in or otherwise provided with suitable balls 37 and secured within the channels of the frame members are brackets 38 having sockets 39 to receive the balls. The torque tube is thus directly connected to the side members of the frame to transmit the thrust directly from the rear axle to both members and the ball and socket joints form universal connections which provide for the distortion of the frame. The axle, by reason of the turning movement of the torque tube in the head 34, is free to rock and to rise and fall relative to the frame, and by arranging the universal joint 40 indicated in dotted lines in Fig. 1 with its axis in the plane of the axes of the ball and socket joints, any cramping or binding of the drive shaft carried by the torque tube is prevented.

The usual service and emergency brake mechanism (not shown) is provided upon the rear axle within suitable brake drums indicated in dotted lines at 41 in Fig. 1, and these brakes are actuated by means of two pairs of connecting rods 42 and 43 in the usual manner. In order that these brakes may not be affected by the movements of the body frame relative to the axle, these connecting rods and the means for actuating the same are preferably mounted upon and carried by the torque tube or its head 34. The service brakes are operated by means of a foot pedal 44 mounted on the frame in the usual manner and connected by a rod 45 to an arm 46 on the rock shaft 47 mounted in suitable bearings secured upon a plate 48 which is bolted to the upper side of the head 34 of the torque tube. The emergency brakes are actuated by any suitable means on the frame (not shown) connected by a rod 49 to an arm 50 secured upon a sleeve 51 on the shaft 47 to turn thereon independently of the shaft. In order that the pull on both of the rods leading to the two emergency brakes shall be equal, they are connected to the ends of an equalizing bar 52, and attached to this bar intermediate its ends is a pull rod 53, the opposite end of which is attached to the free end of an arm 54 on the sleeve 51, so that turning of the sleeve by means of the rod 49 will exert a pull on the equalizing bar and transmit motion to set the brakes. The service brake rods 43 are in a like manner attached to an equalizing bar 55 which is connected intermediate its ends by a rod 56 with an arm 57 on the shaft 47. The equalizing bars are each supported and guided in their movement by means of pairs of arms 58 formed by bending upwardly projecting portions of the plate 48, the arms which support the bar 52 being bent up farther than those which support the bar 55 so that the former will be supported in a plane above the latter. Each of the arms 58 is formed with a longitudinal slot 59 through which a bolt 60 carried by the equalizing bar supported thereon, loosely extends to hold the bar in place upon its support and permit it to slide freely upon its supporting arms. The brake operating mechanism is thus supported to move with the movements of the rear axle, obviating the possibility of partially setting the brakes by a movement of the connecting rods due to a relative movement between the axle and frame. The particular construction of supporting plate for the brake operating mechanism provides a simple and efficient guide and support for the equalizing bars.

Figure 10:
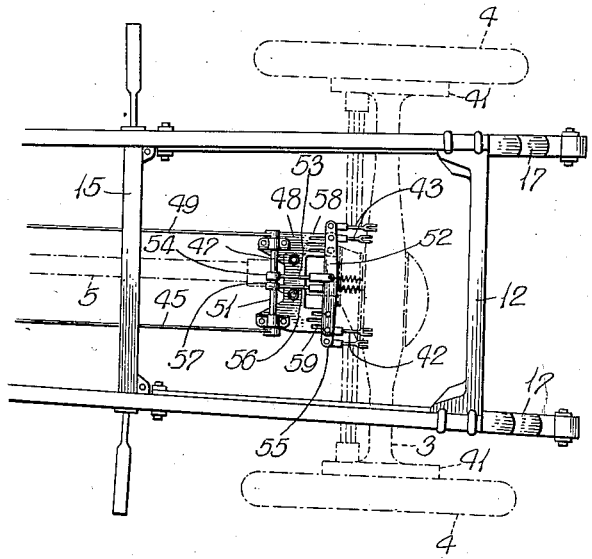
Fig. 10 is a plan view of a portion of the chassis showing a modification in the arrangement of brake mechanism.
Figure 4:
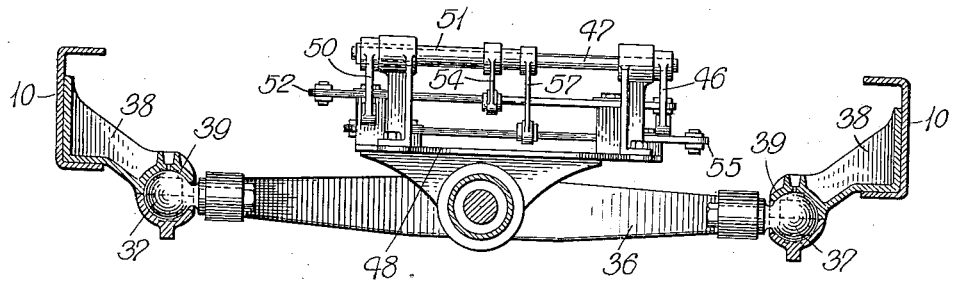
Fig. 4 is a similar detail showing said supporting and operating mechanism in end elevation and a frame and thrust or torque member in section on the line IV—IV of Fig. 1.

In Fig. 10 the arrangement is changed in that the supporting plate 48 instead of being secured to the head 34 is made fast to the torque tube adjacent to the axle, and the rods 42 and 43 are made shorter, and the rods 45 and 49 are lengthened to extend forwardly to the operating levers on the body. Obviously the supporting plate 48 may be secured to any desired portion of the torque tube and other changes may be made in the construction and arrangement of parts without departing from the spirit of my invention and I do not therefore limit myself to the construction shown.

Having thus fully described my invention what I claim is:—

1. In a motor vehicle, the combination with a frame having longitudinal side members, a rear axle supporting the frame, traction wheels on the axle, and a torque tube extending forwardly from the axle, of a head free to turn upon the forward end of the torque tube about the longitudinal axis of the tube, and means carried by each side member of the frame forming a direct pivotal connection between each frame side member and said head, whereby the thrust of the traction wheels is transmitted to the side members of the frame and the axle is free to tilt and rise and fall independently of the frame.

2. In a motor vehicle, the combination with a rear axle and its traction wheels, a frame having longitudinal side members, and a torque tube extending forwardly from said axle, of a head on the forward end of said tube free to turn about the longitudinal axis of said tube, laterally and forwardly extending arms on said head with their outer ends pivotally connected to the side frame members, a drive shaft extending through said torque tube, and a universal joint in said shaft with its pivotal axis in the horizontal plane of the axes of the pivotal connections of said arms to the frame.

3. In a motor vehicle, the combination with a rear axle and its traction wheels, a frame having longitudinal side members, a torque tube secured to and extending forwardly from said axle, a drive shaft in said tube, and a universal joint for said shaft adjacent to the end of the tube, of a head free to turn upon said tube about the longitudinal axis thereof, a pair of arms on said head extending laterally therefrom and forwardly at each side of said universal joint, balls on the ends of said arms, and socket members on the side members of the frame to receive the balls and pivotally connect the same to said frame members.

4. In a motor vehicle, the combination with a frame having side members and an axle supporting said frame, of a torque member extending forwardly from said axle and having pivotal connection with said member, brake mechanism carried by said axle, brake operating mechanism carried by said torque member and operatively connected with said brake mechanism to actuate the same, and manually operable means on said frame for actuating the brake operating mechanism.

5. In a motor vehicle, the combination with a frame having side members, and an axle supporting said frame, of a torque member secured at one end to the axle and having pivotal connection with the side members of the frame at its opposite end, brake mechanism carried by the ends of the axle, an equalizing bar having operative connection with said brake mechanism, means on said torque member for supporting and guiding said bar, and manually operable means on the said frame having operative connection with the said equalizing bar.

6. In a motor vehicle, the combination with a frame having side members and an axle supporting said frame, of a torque member secured at one end to the axle and extending forwardly therefrom, means for pivotally connecting the forward end of the torque member to the frame, brake mechanism carried by the axle, a supporting plate carried by said torque member and having longitudinal slots, an equalizing bar supported by said plate, means engaging the slots to guide said bar, rods connected to the ends of the bar for operating the brake mechanism, and manually operable means on the frame having operable connection with said bar intermediate its ends.

7. In a motor vehicle, the combination with a frame, an axle, and springs supporting the frame upon the axle, of a torque member secured to the axle at one end and extending forwardly therefrom and pivotally connected at its forward end to the frame, brake mechanism carried by the ends of the axle, brake operating mechanism carried by the torque member and comprising a pair of equalizing bars having operative connection at their ends with the brake mechanism, a supporting plate, arms on said plate having longitudinal slots and arranged in different horizontal planes to support the bars, one above the other, means on the bars engaging the slots to guide the bars, and manually operable means on the frame having operative connection with said bars.

8. In a motor vehicle, the combination with a frame, an axle, and springs supporting the frame upon the axle, of a torque member extending forwardly from the axle intermediate the ends thereof, means for pivotally connecting the forward end of said member to the frame to permit the axle to rise and fall and to tilt, brake mechanism on the axle at each end thereof, a supporting plate secured to the torque member and having longitudinally slotted upwardly bent arms, equalizing bars supported by said arms, rods connecting the ends of said bars and the brake mechanism, bolts extending through the slots in the arms for loosely connecting the bars thereto, a rock shaft carried by the plate, arms on the rock shaft, rods connecting certain of said arms and the equalizing bars intermediate their ends, manually operable means on the frame, and rods connecting said means and the other of the arms on the rock shaft.

In testimony whereof I affix my signature in presence of two witnesses.

OLIVER E. BARTHEL.

Witnesses:
ANNA M. DORR,
GENEVIEVE E. McGRANN.